United States Patent [19]
Tate

[11] 3,888,477
[45] June 10, 1975

[54] SPACING TOOL

[76] Inventor: John F. P. Tate, 2819 Westhampton Avenue, S.W., Roanoke, Va. 24015

[22] Filed: Apr. 11, 1974

[21] Appl. No.: 460,197

Related U.S. Application Data

[63] Continuation-in-part of Ser. No. 382,657, July 26, 1973, Pat. No. 3,813,831.

[52] U.S. Cl. .............. 269/82; 33/174 G; 33/180 R; 249/14; 269/152; 269/321 S
[51] Int. Cl. ............................................ E04f 21/26
[58] Field of Search ...... 249/14; 52/749; 144/144.5, 144/288 R, 288 C; 29/200 P, 200 J, 464; 33/174 G, 180 R; 269/40, 43, 45, 321 S, 321 F, 82, 152

[56] References Cited
UNITED STATES PATENTS

| | | | |
|---|---|---|---|
| 487,889 | 12/1892 | Martin | 144/144.5 |
| 611,340 | 9/1898 | Smith | 260/203 X |
| 1,756,351 | 4/1930 | Gentile | 52/190 |
| 2,306,722 | 12/1942 | Fox | 249/14 |
| 2,548,703 | 4/1951 | Cline | 249/14 |
| 2,990,172 | 6/1961 | Gianotta | 269/152 X |

Primary Examiner—Roy Lake
Assistant Examiner—Neil Abrams
Attorney, Agent, or Firm—Mason, Fenwick & Lawrence

[57] ABSTRACT

A time-saving element-spacing tool preferably of an adjustable jig-type for use in expediting uniformly gauging or spacing various elements such as precast step riser elements in a generally parallel descending fashion down sloping terrain. The jig is especially useful when installing complementally interfitting precast stair tread and riser elements particularly for a stringerless type stairway. The jig-tool comprises a support member or assembly adapted to be disposed horizontally, and from which one or more element-positioning-and-holding bracket units are dependingly supported. The bracket units are preferably mounted for adjustment along the support members to adapt to different front-to-rear tread depths and spacings between sequentially installed riser elements. The bracket units are further adjustable to adapt to and complementally slip fit over riser elements of varying thickness.

12 Claims, 8 Drawing Figures

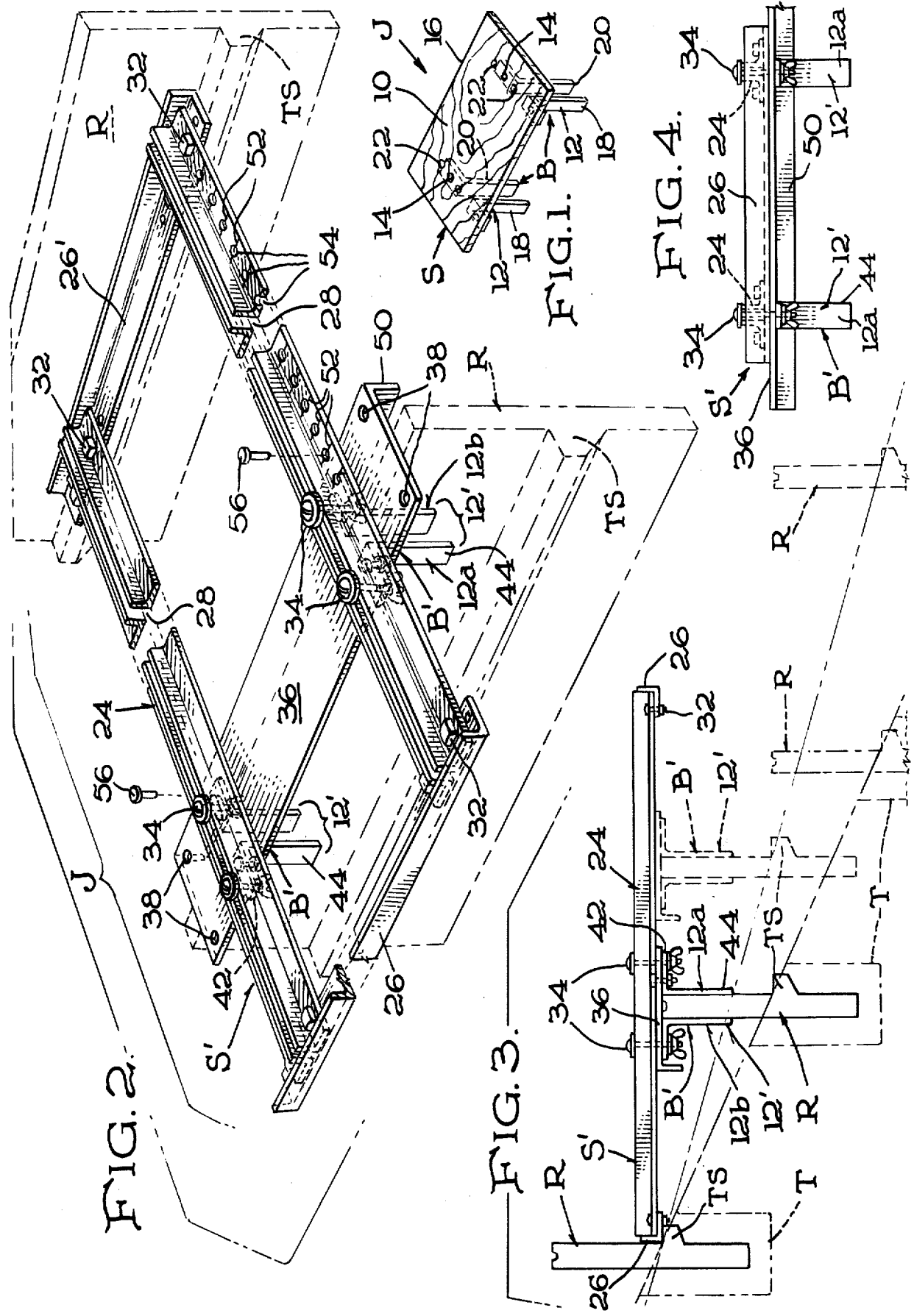

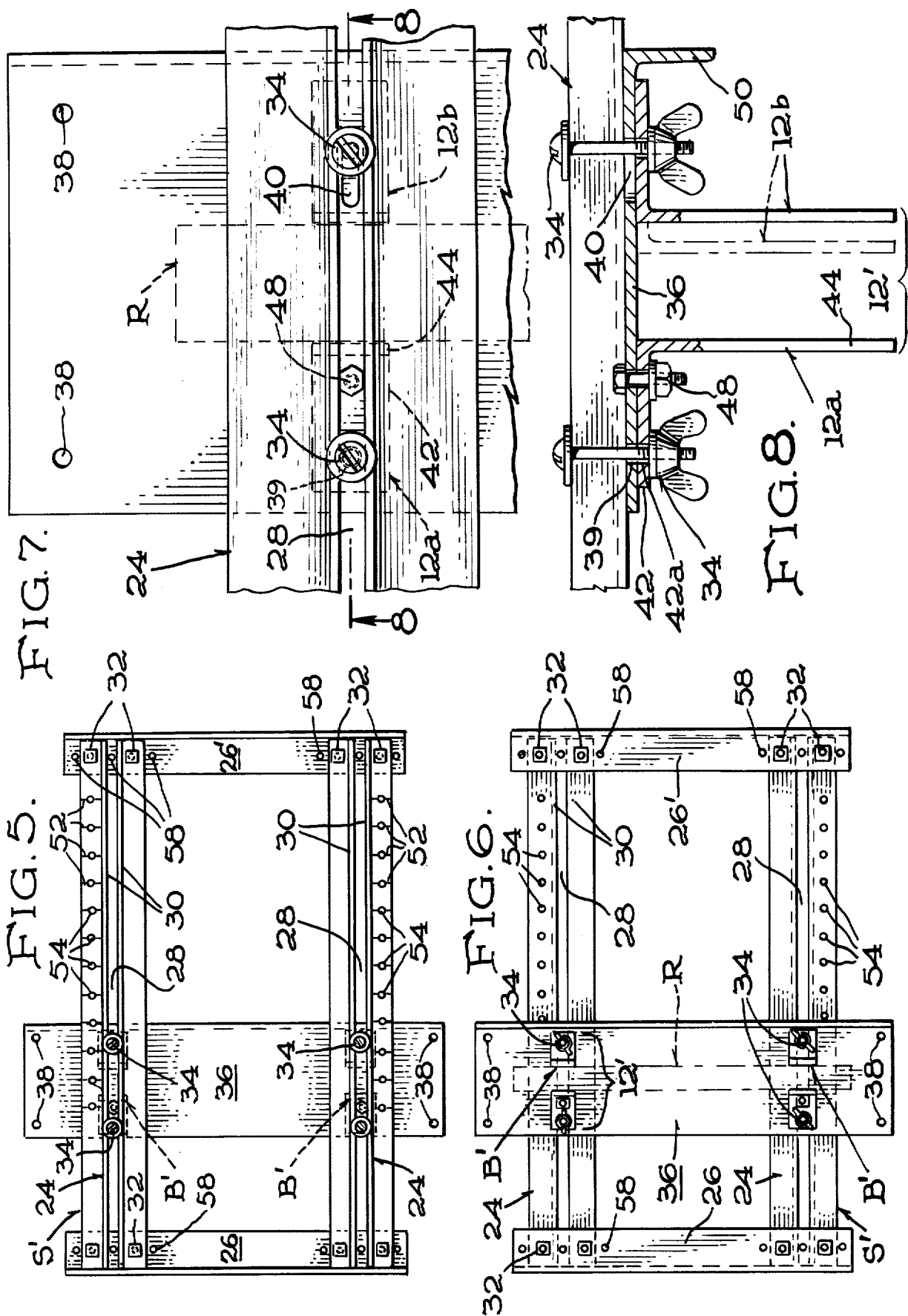

SPACING TOOL

The present invention is a continuation-in-part of my co-pending application Ser. No. 382,657 filed July 26, 1973, now U.S. Pat. No. 3,813,831 issued June 4, 1974.

BACKGROUND AND OBJECTS OF THE INVENTION

The present invention relates to improvements in jig type tools, adaptable broadly for use in spacing objects of various kinds, and more specifically for effecting generally parallel spacing of individual step riser elements while installing complementally interfitting precast stair tread and riser elements particularly for a stringerless stairway on inclined terrain.

Heretofore, whenever pre-formed stairways of this general type have been installed, they either embodied precut or preformed stringer elements, of the use of riser and tread elements which were integrally formed, thereby generally eliminating the problem of establishing a uniform positioning of the riser elements. Otherwise, workmen were required to make several individual hand measurements with a rule, including frequent rechecking attendant placement of the riser and/or tread elements. The empirical nature of previous procedures often would result in an uneven and non-uniform installation requiring substantially greater time.

Accordingly, it is a primary object of this invention to provide novel embodiments of jig-type tool which will facilitate installation of a plurality of objects or elements in generally parallel and preselectable spaced relation.

More specifically, it is a principal object of this invention to provide a novel jig for sequentially positioning and holding pre-formed or precast individual step riser elements in predeterminable spaced parallel relation during installation particularly of a stringerless precast stairway down sloping terrain.

Another object of the invention is to provide a novel jig-type tool of the foregoing character which will eliminate inaccuracies in precast step installation, and which in some preferred embodiments is adjustable in nature to adapt to slopes of varying inclination.

Still a further object is to provide a jig of the foregoing character which embodies sub-adjustment features to readily adapt to use with precast step riser elements of varying cross-sectional thickness.

Various other objects and advantages will become apparent from the detailed description to follow, taken in conjunction with the illustrative drawing figures to be described hereinafter.

BRIEF SUMMARY OF THE INVENTION

The foregoing objectives are achieved by providing, in the simplest form, a support member comprising a planar piece of rigid material, such as plywood, hardboard, aluminum or the like, from which to dependingly support preferably a laterally spaced aligned pair of element-positioning bracket units. Alternately, a single more centrally disposed bracket unit can be used. The bracket units in this simplest form may be non-adjustably affixed at a uniformly spaced distance from one index end of the support member, which distance corresponds generally to the desired tread depth.

The bracket units in this simplest embodiment each may comprise a single inverted U-shaped bracket or two separately attached generally right-angular bracket arms which are spaced to provide a slip fit over the thickness of an upright disposed step riser element. When each unit comprises two separate bracket arms, they can be adjustably mounted selectively within a series of mounting holes provided in the planar support member to provide a modified, simple but adjustable, embodiment of the jig.

The objectives are also achievable by the provision of another preferred and more sophisticated embodiment wherein a support means comprising a pair of elongated slotted beam assemblies which are transversely interconnected at or toward at least one common end thereof, and more preferably at both opposed ends to form a generally parallelogram type support, from which the element-positioning and-holding bracket units are dependingly and preferably relatively adjustably attached. Provision is made to slide the bracket units along the slotways and releasably clamp them at various distances from the index end of the support to thereby adapt its usage to installations on inclined slopeways of varying inclination. This permits the installing of the step-riser elements in either closer together or further apart relation depending upon the slope and desired front-to-back tread depth between successive riser elements.

Further structural and environmental details of my novel jig tool, and the related advantages thereof will be provided in greater detail hereinafter, and will become further apparent to those skilled in the art, having reference to the accompanying illustrative drawings now to be described.

BRIEF DESCRIPTION OF THE DRAWINGS

FIG. 1 is a reduced scale perspective view of a less preferred embodiment of the jig tool of this invention, and representative of the basic jig as disclosed in my copending application Ser. No. 382,657;

FIG. 2 is a generally three-quarter frontal perspective view of one preferred embodiment of the jig of this invention, shown in a riser-positioning use with a pair of precast step riser elements shown in dotted outline;

FIG. 3 is a side elevational view of the jig of FIG. 2, with two of the riser elements shown in solid outline for a given slope, and also showing in dotted lines an adjusted position of a riser-element-positioning-and-holding member for a different modified less steeply inclined slope;

FIG. 4 is a front elevational view of the jib assembly of FIGS. 2 and 3;

FIGS. 5 and 6 are top and bottom plan views respectively of the assembled jig of FIGS. 2–4;

FIG. 7 is an enlarged fragmentary top plan view better showing the adjustability details of the jig of FIGS. 2–6; and FIG. 8 is a similarly enlarged cross-sectional detail view of the components as shown in FIG. 7, as viewed substantially on line 8–8 thereof.

DETAILED DESCRIPTION OF PREFERRED EMBODIMENTS

Reference will now be made more particularly to the illustrated drawing figures, wherein like reference characters designate like parts throughout the various figures.

As disclosed in my copending application Ser. No. 382,657, now U.S. Pat. No. 3,813,831 issued June 4, 1974, the jig-type tool broadly designated J of the present invention is ideally suited for use in installing particularly stringerless knock-down precast stairways, on sloping terrain of varying inclination. Briefly reviewing the novel stairway disclosed in my said co-pending application such a stair or stairway is made up of precast tread and unique riser elements R lending themselves preferably to ridge-and-valley interrelation near the front edge, and embodying an improved deeper set riser element R which contributes to an overall more stabilized installation. The unique, substantially increased overall riser height is preferably approximately twice the finished riser height, but can vary depending upon the geographical local of installation. It has an integrally formed tread-supporting shelf TS provided approximately midway of the extreme top and bottom edges of each riser element so as to establish a finished step rise of approximately 7 or 8 inches which is normally comfortable. The tread-supporting shelf preferably extends across the full lateral width of the riser element. The riser portion contributing to the added overall height thereof resides in that portion which extends substantially below the tread level, and which lower extended portion is adapted to uniquely set in a preferably relatively fine crushed stone bedding or other suitably packed trench or trough T below the natural terrain surface, as shown in FIG. 2 of the drawings. The unique installation provides a normally unyielding foundation of increased stability since the bottom edges of the respective riser elements R are well below the natural sloping ground surface and are essentially permanently protected from wind and rain erosion as well as most frost upheavals. Any ground engageable portion of mainly the top and bottom treads preferably also is set upon a bed of finely crushed stone and/or packed coarse sand to better protect it against the aforesaid elements.

The basic components comprising the Jig J are the main supporting means S, and the element-positioning-and-holding bracket means B.

In the simpler form of FIG. 1, the main supporting means S may comprise a simple planar support member 10 fabricated of a rigid material, such as plywood, hardboard, aluminum or the like, from which the element-positioning bracket means B are dependingly supported. Bracket means B comprise preferably a laterally spaced, aligned pair of element-positioning bracket units 12. Alternately, a single more centrally disposed bracket unit can be used. The bracket units 12 in this simplest form may be non-adjustably affixed by fasteners 14 at a uniformly spaced distance from one index end 16 of the support member 10, which distance corresponds generally to the desired tread depth.

The bracket units 12 in this simplified embodiment each may comprise either a single inverter U-shaped bracket (not shown), or two separately attached generally right-angular strap-like bracket arms 18 and 20 which are spaced to provide a slip fit over the thickness of an upright disposed step riser element R. When each unit comprises two separate bracket arms, they can be further adjustably mounted selectively within a slot or a series of mounting holes 22 aptly provided in the planar support member 10 to provide adjustment therein to accomodate riser elements of varying thickness.

Reference may be had to my said issued U.S. Pat. No. 3,813,831 for a more detailed description of the step installation and accompanying use of the jig J. For purposes herein, suffice it to say that there is an initial tread-established support level and initial riser element starting point between corner working points at the top of a designated stair run. Thereafter, the initial riser location is gauged by use of the jig, by which the index end 16 is abutted with the above-mentioned initial starting point. Beneath where the downwardly projecting bracket arms indicate, a shallow trench is dug out with a narrow spade or the like, and sufficiently wide and deep to centrally receive therein the lower projecting portion of the riser element R. The bracket arms 18 and 20 complementally hold opposite faces of the riser element in an upright manner while the base or lowermost portion thereof is back-filled around to firmly stabilize the riser element in its prescribed location and determined height.

Installation is progressively made working from the top of the slope downward. The jig J is similarly used to progressively set each of the next riser elements by placement of the index end 16 upon the tread-supporting shelf TS and flush with the adjacent upright face of the riser element previously installed. A trench T is dug for each riser element as mentioned hereinabove.

Reference will now be made to another preferred and more sophisticated embodiment depicted in FIGS. 2–8, wherein the support means S' is more complex and comprises a pair of elongated beam assemblies 24,24 which are transversely interconnected at or toward at least one common end thereof, and more preferably at both opposed ends by cross-members 26,26', to form a generally rectangular parallelogram type support S' from which the element-positioning-and-holding bracket means B' are dependingly and preferably relatively adjustably attached.

Each beam assembly 24 comprises means forming an adjustment slot 28 throughout preferably a major part of its length as shown. The means forming the slots 28 preferably are a pair of elongated rigid members 30,30 of generally right-angular cross-section, which may be detachably connected by fasteners 32 to the cross members 26,26'. Said cross members 26,26' are also preferably of right-angular cross-section as shown. The transverse cross member 26' denotes the index end of the support S'. Members 30,30 are slightly spaced apart sufficiently to receive the shank portions of bolt-and-wing nut assemblies 34, and head of bolts 48, better seen in FIGS. 7 and 8, and whose functions are to be described in more detail hereinafter.

In this embodiment of FIGS. 2–8, the element-positioning and supporting bracket means B' comprises a laterally elongated rigid member 36 of preferably generally planar form which also preferably transversely exceeds the span between the beam assemblies 24. The lateral or transverse span or length of plate 36 preferably is a few inches greater than the corresponding width of the stair treads and riser elements being installed. In this manner, plate 36 can serve as a template by being provided with four strategically placed corner holes 38 through which marker rods, or the like, can be temporarily inserted to delineate the length and width dimensions of the trench T to be dug. The trenches T accomodate the lower portion of the riser element and the preferably crushed stone or other appropriate granular material upon and in which to embed the lower portion of each riser element R. The crushed stone serves not only to stabilize the riser element in its prescribed position and elevation, but also serves as a drainage bed to help dissipate any runoff surface water and to protect against frost upheavals in colder geographical areas of use.

Plate 36 has a pair of apertures 39 (FIGS. 7 and 8) disposed for alignment with the adjustment slots 28, and preferably oriented to be most remote from the index end cross member 26'. Apertures 39 are slightly larger than the bolt shank diameter of the bolt-and-wing nut assemblies 34. The template-serving member 36 also is provided with a corresponding pair of adjustment slots 40,40, (FIGS. 7 and 8) in alignment with apertures 39 and the elongated slots 28 of the beam assemblies 24. The slots 40,40 are sized to receive the bolt shank of other bolt-and-wing nut assemblies in a similar manner as with apertures 39.

The element-positioning and supporting bracket means B' further comprise the laterally spaced bracket units 12',12', which correspond essentially to the bracket units 12,12 in the FIG. 1 embodiment. Each bracket unit 12' preferably comprises a relatively fixed and a relatively adjustable right-angle bracket arm, 12a and 12b respectively. Bracket arm 12a can be of a rod or strap-like form provided with a shorter leg 42 for mounting adjacent the underside of the template member 36, and a longer linear second leg 44 for engagement with one face of the riser element R. The shorter leg 42 is appropriately apertured at 42a (FIG. 8) to receive the bolt shank of the bolt-and-wing nut assembly 34. Additionally, the leg 42 and template 36 may be jointly apertured to receive a fastener bolt 48 to fixedly attach the bracket arm to the template. The bolt head is of a size to fit within the slot 28 formed between the elongated beam arms 30,30. Alternatively, the bracket leg 42 can be welded or otherwise integrally formed with or struck from plate 36.

The other bracket arm 12b is essentially of the same strap-like form and shape as 12a, but is provided only with an aperture corresponding to aperture 42a, to receive the bolt of assembly 34. The depending length of the bracket legs 44 is always less than the height of the riser between the tread-supporting shelf TS and the top edge of the riser element.

It is apparent that the foregoing adjustment features enable the element-positioning-and-supporting means B', including the template and bracket supporting plate 36, to be adjusted to various positions along the beam assemblies 24. This is achieved by merely loosening the bolt-and-wing-nut assemblies, sliding the plate 36, as supported by the bolt heads and washers of the assemblies 34, to the desired portion relative to the index end portion 26', and subsequently tightening the wing nuts thereof.

The additional sub-adjustment feature for moving the bracket arms 12b relative to bracket arms 12a is achieved by similar adjustment of the bolt-and-wing nut assembly with the slot 40 of template 36. In this manner the bracket arms 12a and 12b can be adjusted to accomodate riser elements of different thickness.

The template 36 also may optionally be provided along one edge with a depending flange 50 to serve as a strengthening and/or an abutment flange against which the upper leg of the bracket arm 12b may abut when in a maximum adjusted position.

To better facilitate establishing the position of the template 36, and the dependingly support bracket units 12' along the beam assemblies 24, the latter may be provided with suitable indicia means at uniform spacings along one or both of the flanges of one of the angle members 30. The indicia means are shown herein to comprise both line markings 52 and spacer holes 54 centered on the line markings 52. The distance between the markings may be 1 inch or any other desired increment. The holes 54 are adapted to receive the shank portion of a pair of bolts, nails, cotter pins, or the like, designated 56 in FIG. 2, against which the flanged edge 50 of the template 36 can be held while making the desired adjustment and during tightening of the wing bolt assemblies 34.

The transverse cross members 26,26' may be fabricated in various lengths depending upon the width of the stairs to be installed. They also can be provided with a plurality of adjustment holes 58 to vary the lateral spacing between the beam assemblies 24,24.

From the foregoing detailed description and illustrative drawings, the constructional and functional features of this jig are believed to be very apparent and the operation thereof need not be reviewed again.

While two specific embodiments have been disclosed and illustrated, it is contemplated that other variations may be made without departing from the inventive concept. For example, the jig could be made with the beam assemblies and transverse connecting members fabricated of heavy duty planar stock material provided with appropriate slots and holes. In some instances the beam assemblies can be rigidly joined together only at one end in a double-T or generally U-shaped form, with the adjustable template 36 movable toward and away from whichever end is designated to be the index end of the jig.

It is also contemplated that the bracket units 12,12' could be made with only the forwardmost bracket arm, 12a, for another comtemplated embodiment, whereby the riser element would abut against only the one bracket arm. More particularly, this may be especially useful where the riser element is preferred to be canted slightly forward, which is not uncommon. Under these circumstances the depending legs, corresponding to leg 44, would be angled obtusely relative to the shorter top leg 42, and the riser element would then lean forwardly against the inclined bracket leg.

The jig is primarily intended for use in installing precast stair elements in a straight run, but with some adjustment of the holes through which the fastener bolt-and-wing nut assemblies 34 cooperate to enable the bracket units 12 to be aligned obliquely relative to the straight index end portion, or otherwise providing oblique extensions to the index end of the jig, it is contemplated that the jig also can be successfully used to install the riser elements in a non-parallel manner, where certain circumstances may require a slight fan-shaped or curved set of steps. It is understood that in such circumstances the tread elements would be precast in the prescribed corresponding non-rectangular shape.

The foregoing and other variations may suggest themselves to those skilled in the art, without departing from the scope of the inventive concept as defined in the appended claims.

I claim:

1. A jig for use in uniformly installing in sloping terrain preformed step riser elements of stairs fabricated from pre-formed interfitting riser and tread elements, said riser and tread elements each comprising generally planar rectangular members of predetermined thickness and having opposed generally planar faces, said jig comprising:

a. support means including a support member disposed for horizontal disposition, having one end constituting an index end portion from which to progressively gauge a predetermined spacing of said riser elements commencing from an initial starting point working down the slope and from each subsequently installed riser element;
  b. riser-element-positioning bracket means dependingly attached transversely to said support member at a predetermined distance from said index portion end, said distance corresponding essentially to the selected tread distance of the steps being installed;
  c. said bracket means comprising at least a first pair of laterally spaced bracket members each having linear portions spaced substantially the same distance from said index end portion, said linear portions being spaced laterally apart to attain coplanar engagement with at least portions of one common face of said riser elements to establish the spacing thereof from said index end portion and in an upright riser manner; and
  d. the related stair installation including using riser elements having substantial extra height in excess of the finished step riser height, wherein a lowermost portion of each riser element is to be embedded within narrow excavated trenches, which lowermost portions are packed preferably with gravel and/or granular fill; and said riser-element-holding bracket means of said jig including a template having four strategically spaced apart holes, with two holes each disposed near laterally opposite sides of said support member so as to define by marking therethrough length and width corner limits of a predetermined size trench having a plan view greater than the thickness of said riser element, and within which said riser element is to be embedded generally centrally relative to the length and width of said trench.

2. An adjustable jig for sequentially aligning and spacing along a generally longitudinal run elongated parallel planar-like elongated elements being positioned in a predetermined relationship; said jig comprising in combination:

a. a generally horizontally disposed support member including a pair of laterally spaced, generally parallel beam assemblies disposed longitudinally in a direction of the run of parallel elements being spaced;
  b. each of said beam assemblies including means forming an adjustment slot throughout a major part of its longitudinal length;
  c. transverse beam-connecting means fixedly interconnecting said beam assemblies near at least one common end thereof in a fixable predetermined spaced apart relationship;
  d. said beam assemblies having at least one pair of respectively corresponding ends transversely aligned with one another and disposed at substantially 90° relative to the longitudinal length of said beam assemblies and constituting index end portions from which to gauge a predetermined spacing of said elements during installation use; and
  e. transversely disposed element-positioning-and-holding means bridgingly and adjustably connected to said beam assemblies by means of fasteners cooperatively disposed through said adjustment slots of said beam assemblies, said element-positioning-and-holding means including a pair of laterally spaced depending brackets having portions for temporarily engaging opposite faces of said planar-like elongated elements being spaced and positioned.

3. An adjustable jig as defined in claim 2, further including transverse connecting means fixedly interconnecting said beam assemblies together at their respectively opposite ends to form a generally parallelogram type support means for said adjustably disposed element-positioning-and-holding means connected thereto.

4. An adjustable jig as defined in claim 2, wherein said element-positioning-and-holding means of paragraph (e) includes a laterally extended template member having laterally spaced holes corresponding to the spacing between said slots of said beam assemblies, and selectively removable nut-and-bolt fastener means for adjustably connecting said element-positioning-and-holding means to said beam assemblies.

5. An adjustable jig as defined in claim 2, wherein each of said brackets include fore-and-aft spaced arms, and means for mounting one of said arms for adjustment toward and away from the other arm to accomodate therebetween elements of selectively different thickness.

6. An adjustable jig as defined in claim 2, wherein said beam assemblies each include a pair of elongated members of angular cross-section spaced apart to define a slotway through which said fasteners of paragraph (e) are disposed; and said transverse beam-connecting means of paragraph (c) includes a member having angularly disposed flanges, and on one flange of which said pairs of elongated members of said beam assemblies are supported in a fixed manner.

7. An adjustable jig as defined in claim 2 wherein said beam assemblies include a plurality of uniformly spaced indicia means for facilitating the selectively setting and the adjustable transverse disposition of said element-positioning-and-holding means.

8. An adjustable jig for use in uniformly installing in sloping terrain pre-formed step riser elements of stairs fabricated from pre-formed interfitting riser and tread elements, said riser elements having lowermost extended portions adapted to be stably embedded in narrow excavated trenches which are repacked preferably with gravel and/or granular fill; said jig comprising in combination:

a. a generally horizontally disposed support member including a pair of laterally spaced, generally parallel beam assemblies disposed longitudinally in a direction of the run of said riser elements being spaced;
  b. each of said beam assemblies including a pair of elongated members of angular cross-section and spaced slightly apart for forming an adjustment slot throughout a major part of its longitudinal length;
  c. transverse beam-connecting means fixedly interconnecting said beam assemblies at opposite ends in a fixable predetermined spaced-apart relationship;

d. said beam assemblies having at least one pair of respectively corresponding ends transversely aligned with one another and disposed at substantially 90° relative to the length of said beam assemblies and constituting index end portions from which to gauge a predetermined spacing of said elements being installed;

e. transversely disposed riser element-positioning-and-holding means bridgingly and adjustably connected to said beam assemblies via fasteners cooperatively disposed through said adjustment slots of said beam assemblies; and wherein f. said riser-element-positioning-and-holding means comprises two laterally spaced bracket units, each of said bracket units comprising a first depending bracket member having a linear surface portion to be disposed in coplanar engagement with portions of one face of said riser elements and having a second depending bracket member spaced apart from the first bracket member a distance corresponding substantially to the thickness of said riser elements to engage an opposite face thereof whereby the pair of bracket members of each unit complementally embrace the opposite faces of and stabilize the riser element during installation thereof.

9. An adjustable jig for sequentially aligning and spacing along a generally longitudinal run elongated parallel elements being positioned in a predetermined relationship; said jig comprising in combination:

a. a generally horizontally disposed support member including a pair of laterally spaced, generally parallel beam assemblies disposed longitudinally in a direction of the run of parallel elements being spaced;

b. each of said beam assemblies including an elongated longitudinal beam member and means forming an adjustment slot throughout a major part of its longitudinal length;

c. transverse beam-connecting means fixedly interconnecting said beam assemblies near at least one common end thereof in a fixable predetermined spaced apart relationship;

d. said beam assemblies having at least one pair of respectively corresponding ends transversely aligned with one another and disposed at substantially 90° relative to the longitudinal length of said beam assemblies and constituting index end portions from which to gauge a predetermined spacing of said elements during installation use;

e. transversely disposed element-positioning-and-holding means including a transverse beam member having a straight edge bridgingly and adjustably connected to said beam assemblies by means of fasteners cooperatively disposed through said adjustment slots of said beam assemblies and carrying bracket members extending therefrom adjacent said beam assemblies for engaging and positioning the elements being positioned; and f. said longitudinal beam members each having an elongated series of uniformly spaced vertical holes and associated indicia means located along a path paralleling and adjacent said slot removably receiving a pin-like abutment member extending through and below a hole of each series to provide a pair of temporary abutments for the straight edge of said transverse beam to locate the same during tightening of the fasteners in said slots and thereby facilitate setting of said element-positioning-and-holding means at selected positions.

10. A jig as defined in claim 2, wherein said transversely disposed element-positioning-and-holding means includes a template having four strategically spaced apart holes, with two holes each disposed near laterally opposite sides of said element-positioning-and-holding means so as to define by marking therethrough length and width corner limits of a predetermined size trench having a plan view size greater than the thickness of the planar-like elongated elements to be positioned by said jig to thereby define the corner limits for a trench within which portions of the planar-like elongated elements may be embedded.

11. A jig as defined in claim 8, wherein the related stair installation includes using riser elements having substantial extra height in excess of the finished step riser height and wherein the lowermost portion of each riser element is to be embedded within narrow excavated trenches to be thereafter packed with gravel or granular fill, said riser element-positioning-and-holding means of said jig including a template having four strategically spaced apart holes, with two holes each disposed near laterally opposite sides of said support member so as to define by marking therethrough length and width corner limits of a predetermined size trench having a plan view size greater than the thickness of said riser element, and within which said riser element is to be embedded generally centrally relative to the length and width of said trench.

12. A jig as defined in claim 9, wherein the transverse beam member forms a template having four strategically spaced apart holes, with two holes each disposed near laterally opposite sides of said support member so as to define by marking therethrough length and width corner limits of a predetermined size trench having a plan view size greater than the thickness of said elongated elements to be positioned by the jig to thereby define the corner limits for a trench within which portions of the elongated elements may be embedded generally centrally relative to the length and width of said trench.

* * * * *